US008244702B2

(12) United States Patent
Dettinger et al.

(10) Patent No.: US 8,244,702 B2
(45) Date of Patent: *Aug. 14, 2012

(54) MODIFICATION OF A DATA REPOSITORY BASED ON AN ABSTRACT DATA REPRESENTATION

(75) Inventors: Richard D. Dettinger, Rochester, MN (US); Jennifer L. LaRocca, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 1699 days.

This patent is subject to a terminal disclaimer.

(21) Appl. No.: 10/403,366

(22) Filed: Mar. 31, 2003

(65) Prior Publication Data

US 2003/0167274 A1 Sep. 4, 2003

Related U.S. Application Data

(63) Continuation-in-part of application No. 10/083,075, filed on Feb. 26, 2002, now Pat. No. 6,996,558.

(51) Int. Cl.
*G06F 17/30* (2006.01)
(52) U.S. Cl. ...................................... 707/700
(58) Field of Classification Search .................. 707/4
See application file for complete search history.

(56) References Cited

U.S. PATENT DOCUMENTS

| 5,253,362 A | 10/1993 | Nolan et al. |
| 5,265,246 A | 11/1993 | Li et al. |
| 5,345,586 A * | 9/1994 | Hamala et al. ................. 1/1 |
| 5,369,778 A | 11/1994 | San Soucie et al. |
| 5,404,510 A | 4/1995 | Smith et al. |
| 5,418,950 A | 5/1995 | Li et al. |
| 5,446,885 A | 8/1995 | Moore et al. |
| 5,446,890 A | 8/1995 | Renslo et al. |

(Continued)

FOREIGN PATENT DOCUMENTS

JP  2002149697 A  5/2002

OTHER PUBLICATIONS

Dettinger et al., IBM Patent U.S. Appl. No. 10/083,075, filed Feb. 26, 2002, "Improved Application Portability and Extensibility Through Database Schema and Query Abstraction".
Dettinger et al., IBM Patent U.S. Appl. No. 10/132,228, filed Apr. 25, 2002, "Dynamic End User Specific Customization of an Application's Physical Data Layer Through a Data Repository Abstraction Layer".
Dettinger et al., IBM Patent U.S. Appl. No. 10/131,984, filed Apr. 25, 2002, "Remote Data Access and Integration of Distributed Data Sources Through Data Schema and Query Abstraction".

(Continued)

*Primary Examiner* — Farhan Syed
(74) *Attorney, Agent, or Firm* — Patterson & Sheridan, LLP

(57) ABSTRACT

The present invention is generally directed to a system, method and article of manufacture for modifying data represented abstractly through an abstraction model. In one embodiment, a data repository abstraction layer provides a logical view of an underlying data repository that is independent of the particular manner of data representation. A query abstraction layer is also provided and is based on the data repository abstraction layer. A runtime component performs translation of an abstract query into a form that can be used against a particular physical data representation.

12 Claims, 13 Drawing Sheets

U.S. PATENT DOCUMENTS

| | | | |
|---|---|---|---|
| 5,459,859 A | 10/1995 | Senda | |
| 5,471,611 A | 11/1995 | McGregor | |
| 5,499,368 A | 3/1996 | Tate et al. | |
| 5,506,984 A | 4/1996 | Miller | |
| 5,515,488 A | 5/1996 | Hoppe et al. | |
| 5,592,663 A | 1/1997 | Nagamori | |
| 5,630,121 A | 5/1997 | Braden-Harder et al. | |
| 5,701,453 A | 12/1997 | Maloney et al. | |
| 5,721,903 A | 2/1998 | Anand et al. | |
| 5,725,227 A | 3/1998 | Mayer | |
| 5,734,887 A * | 3/1998 | Kingberg et al. | 707/4 |
| 5,809,497 A | 9/1998 | Freund et al. | |
| 5,870,559 A | 2/1999 | Leshem et al. | |
| 5,918,232 A | 6/1999 | Pouschine et al. | |
| 5,943,666 A | 8/1999 | Kleewein et al. | |
| 5,958,008 A | 9/1999 | Pogrebisky et al. | |
| 5,987,446 A * | 11/1999 | Corey et al. | 1/1 |
| 5,999,933 A | 12/1999 | Mehta | |
| 6,003,034 A | 12/1999 | Tuli | |
| 6,009,422 A | 12/1999 | Ciccarelli | |
| 6,014,656 A | 1/2000 | Hallmark et al. | |
| 6,026,363 A | 2/2000 | Shepard | |
| 6,061,506 A | 5/2000 | Wollaston et al. | |
| 6,076,066 A | 6/2000 | DiRienzo et al. | |
| 6,222,540 B1 | 4/2001 | Sacerdoti | |
| 6,226,650 B1 * | 5/2001 | Mahajan et al. | 707/625 |
| 6,233,586 B1 | 5/2001 | Chang et al. | |
| 6,272,488 B1 | 8/2001 | Chang et al. | |
| 6,289,334 B1 | 9/2001 | Reiner et al. | |
| 6,353,826 B1 | 3/2002 | Seputis | |
| 6,370,547 B1 | 4/2002 | Eftink | |
| 6,397,223 B1 | 5/2002 | Kori | |
| 6,442,543 B1 | 8/2002 | Snodgrass et al. | |
| 6,449,620 B1 | 9/2002 | Draper et al. | |
| 6,457,003 B1 | 9/2002 | Gajda et al. | |
| 6,457,009 B1 | 9/2002 | Bollay | |
| 6,460,043 B1 * | 10/2002 | Tabbara et al. | 1/1 |
| 6,484,162 B1 | 11/2002 | Edlund et al. | |
| 6,546,388 B1 | 4/2003 | Edlund et al. | |
| 6,553,368 B2 | 4/2003 | Martin et al. | |
| 6,578,027 B2 | 6/2003 | Cambot et al. | |
| 6,581,038 B1 | 6/2003 | Mahran | |
| 6,581,054 B1 | 6/2003 | Bogrett | |
| 6,601,065 B1 | 7/2003 | Nelson et al. | |
| 6,609,123 B1 | 8/2003 | Cazemier et al. | |
| 6,611,838 B1 * | 8/2003 | Ignat et al. | 1/1 |
| 6,618,727 B1 | 9/2003 | Wheeler et al. | |
| 6,633,817 B1 | 10/2003 | Walker et al. | |
| 6,643,633 B2 | 11/2003 | Chau et al. | |
| 6,647,382 B1 | 11/2003 | Saracco | |
| 6,651,055 B1 | 11/2003 | Kilmer et al. | |
| 6,725,225 B1 | 4/2004 | Kori | |
| 6,725,227 B1 | 4/2004 | Li | |
| 6,732,094 B1 | 5/2004 | Cousins et al. | |
| 6,745,178 B1 | 6/2004 | Emens et al. | |
| 6,772,150 B1 | 8/2004 | Whitman et al. | |
| 6,795,825 B2 | 9/2004 | Rishe | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 * | 10/2005 | Dettinger et al. | 707/774 |
| 6,978,324 B1 | 12/2005 | Black | |
| 6,985,912 B2 | 1/2006 | Mullins et al. | |
| 6,996,558 B2 * | 2/2006 | Dettinger et al. | 1/1 |
| 7,003,730 B2 | 2/2006 | Dettinger et al. | |
| 7,024,425 B2 | 4/2006 | Krishnaprasad et al. | |
| 7,054,877 B2 | 5/2006 | Dettinger et al. | |
| 7,096,217 B2 | 8/2006 | Dettinger et al. | |
| 7,096,229 B2 | 8/2006 | Dettinger et al. | |
| 7,139,774 B2 | 11/2006 | Dettinger et al. | |
| 7,146,376 B2 | 12/2006 | Dettinger et al. | |
| 7,185,317 B2 | 2/2007 | Fish et al. | |
| 7,213,017 B2 | 5/2007 | Rys et al. | |
| 7,249,118 B2 | 7/2007 | Sandler et al. | |
| 7,263,517 B2 | 8/2007 | Sheu et al. | |
| 7,305,656 B2 | 12/2007 | Fish et al. | |
| 7,310,639 B2 | 12/2007 | Dettinger et al. | |
| 7,321,895 B2 | 1/2008 | Dettinger et al. | |
| 7,333,981 B2 | 2/2008 | Dettinger et al. | |
| 7,340,475 B2 | 3/2008 | Chowdhary et al. | |
| 7,343,365 B2 | 3/2008 | Farnham et al. | |
| 7,363,287 B2 | 4/2008 | Kilmer et al. | |
| 7,383,255 B2 | 6/2008 | Desai et al. | |
| 7,398,263 B2 | 7/2008 | Dettinger et al. | |
| 7,440,945 B2 | 10/2008 | Dettinger et al. | |
| 7,444,332 B2 | 10/2008 | Dettinger et al. | |
| 7,461,052 B2 | 12/2008 | Dettinger et al. | |
| 7,480,648 B2 | 1/2009 | Adams et al. | |
| 7,519,577 B2 | 4/2009 | Brundage et al. | |
| 7,539,662 B2 | 5/2009 | Dettinger et al. | |
| 7,624,097 B2 | 11/2009 | Dettinger et al. | |
| 7,668,806 B2 | 2/2010 | Liu et al. | |
| 7,818,347 B2 | 10/2010 | Dettinger et al. | |
| 7,818,348 B2 | 10/2010 | Dettinger et al. | |
| 2001/0016843 A1 | 8/2001 | Olson et al. | |
| 2001/0037345 A1 | 11/2001 | Kiernan et al. | |
| 2001/0047270 A1 | 11/2001 | Gusick et al. | |
| 2002/0026630 A1 | 2/2002 | Schmidt et al. | |
| 2002/0032676 A1 | 3/2002 | Reiner et al. | |
| 2002/0046281 A1 | 4/2002 | Cope | |
| 2002/0078068 A1 | 6/2002 | Krishnaprasad et al. | |
| 2002/0091702 A1 | 7/2002 | Mullins | |
| 2002/0091990 A1 | 7/2002 | Little et al. | |
| 2002/0123984 A1 | 9/2002 | Prakash | |
| 2002/0161602 A1 | 10/2002 | Dougherty et al. | |
| 2003/0014399 A1 | 1/2003 | Hansen et al. | |
| 2003/0046385 A1 | 3/2003 | Vincent | |
| 2003/0046390 A1 | 3/2003 | Ball et al. | |
| 2003/0061215 A1 | 3/2003 | Messina | |
| 2003/0144994 A1 | 7/2003 | Wen et al. | |
| 2003/0154191 A1 | 8/2003 | Fish et al. | |
| 2003/0163455 A1 | 8/2003 | Dettinger et al. | |
| 2003/0169284 A1 | 9/2003 | Dettinger et al. | |
| 2003/0172056 A1 * | 9/2003 | Dettinger et al. | 707/3 |
| 2003/0208458 A1 * | 11/2003 | Dettinger et al. | 707/1 |
| 2003/0208486 A1 * | 11/2003 | Dettinger et al. | 707/6 |
| 2003/0212666 A1 | 11/2003 | Basu et al. | |
| 2003/0214525 A1 | 11/2003 | Esfahany | |
| 2003/0217033 A1 | 11/2003 | Sandler et al. | |
| 2003/0220893 A1 | 11/2003 | Dettinger et al. | |
| 2004/0039736 A1 | 2/2004 | Kilmer et al. | |
| 2004/0039820 A1 | 2/2004 | Colby et al. | |
| 2004/0048233 A1 | 3/2004 | Matthews et al. | |
| 2004/0059746 A1 | 3/2004 | Error et al. | |
| 2004/0073539 A1 | 4/2004 | Dettinger et al. | |
| 2004/0088561 A1 | 5/2004 | Dettinger et al. | |
| 2004/0148278 A1 | 7/2004 | Milo et al. | |
| 2004/0158567 A1 | 8/2004 | Dettinger et al. | |
| 2004/0172305 A1 | 9/2004 | Soerensen et al. | |
| 2004/0243545 A1 | 12/2004 | Boone et al. | |
| 2004/0260685 A1 | 12/2004 | Pfleiger et al. | |
| 2004/0260691 A1 | 12/2004 | Desai et al. | |
| 2004/0267760 A1 | 12/2004 | Brundage et al. | |
| 2005/0068489 A1 | 3/2005 | Hall et al. | |
| 2005/0071222 A1 | 3/2005 | Bigus et al. | |
| 2005/0075996 A1 | 4/2005 | Dettinger et al. | |
| 2005/0076015 A1 | 4/2005 | Dettinger et al. | |
| 2005/0193114 A1 | 9/2005 | Colby et al. | |
| 2005/0267760 A1 | 12/2005 | Meyer et al. | |
| 2006/0010127 A1 | 1/2006 | Dettinger et al. | |
| 2006/0047638 A1 | 3/2006 | Dettinger et al. | |
| 2006/0053142 A1 | 3/2006 | Sebbane | |
| 2006/0095457 A1 | 5/2006 | Glasspool et al. | |
| 2006/0122993 A1 | 6/2006 | Dettinger et al. | |
| 2006/0136382 A1 | 6/2006 | Dettinger et al. | |
| 2006/0136469 A1 | 6/2006 | Dettinger et al. | |
| 2006/0136470 A1 | 6/2006 | Dettinger et al. | |
| 2006/0155692 A1 | 7/2006 | Dettinger et al. | |
| 2006/0161521 A1 | 7/2006 | Dettinger et al. | |
| 2006/0161523 A1 | 7/2006 | Dettinger et al. | |
| 2006/0212418 A1 | 9/2006 | Dettinger et al. | |
| 2006/0282469 A1 | 12/2006 | Pan | |
| 2007/0005566 A1 | 1/2007 | Bobick et al. | |
| 2007/0067371 A1 | 3/2007 | Allan et al. | |
| 2007/0112745 A1 | 5/2007 | Dettinger et al. | |
| 2007/0112827 A1 | 5/2007 | Dettinger et al. | |
| 2008/0091668 A1 | 4/2008 | Dettinger et al. | |

| | | |
|---|---|---|
| 2008/0215611 A1 | 9/2008 | Dettinger et al. |
| 2008/0215612 A1 | 9/2008 | Dettinger et al. |
| 2008/0301108 A1 | 12/2008 | Dettinger et al. |
| 2009/0055438 A1 | 2/2009 | Dettinger et al. |
| 2009/0182708 A1 | 7/2009 | Dettinger et al. |
| 2010/0076961 A1 | 3/2010 | Dettinger et al. |

OTHER PUBLICATIONS

Batory et al., "Implementing a Domain Model for Data Structures[1,2]," *International Journal of Software Engineering and Knowledge Engineering,* Sep. 1992, vol. 2(3): pp. 375-402.

Braunmüller et al., "Multiple Similarity Queries: A Basic DBMS Operation for Mining in Metric Databases," *IEEE Transactions on Knowledge and Data Engineering,* Jan./Feb. 2001, vol. 13(1): pp. 79-95.

Franconi et al., "A Data Warehouse Conceptual Data Model for Multidimensional Aggregation," *Proceedings of the International Workshop on Design and Management of Data Warehouses (DMDW '99),* 1999: pp. 13-1-13-10.

Lerm et al., "Cooperative Access to Relational and Object-Oriented Federated Databases," *IEEE Proceedings of the Fourth Workshop on Future Trends of Distributed Computing Systems,* Sep. 1993: pp. 222-227.

Llama, "Search Code: Search Your Database," <http://www.codewalkers.com/c/a/Search-Code/Search-Your-Database/>, retrieved Mar. 23, 2009, pp. 1-4.

Meng et al., "A Theory of Translation From Relational Queries to Hierarchical Queries," *IEEE Transactions on Knowledge and Data Engineering,* Apr. 1995, vol. 7(2): pp. 228-245.

Office Action History for U.S. Appl. No. 10/083,075 from Nov. 26, 2004 to Sep. 1, 2005.

Office Action History for U.S. Appl. No. 11/226,181 from Mar. 25, 2009 to Aug. 10, 2010.

Office Action History for U.S. Appl. No. 10/132,228 from Sep. 23, 2004 to Mar. 16, 2005.

Office Action History for U.S. Appl. No. 10/131,984 from Sep. 23, 2004 to May 19, 2005.

Office Action History for U.S. Appl. No. 10/403,960 from Apr. 7, 2006 to May 30, 2008.

Office Action History for U.S. Appl. No. 10/403,356 from Sep. 20, 2005 to Jan. 12, 2006.

Office Action History for U.S. Appl. no. 11/360,353 from Feb. 21, 2008 to Jan. 21, 2009.

Office Action History for U.S. Appl. No. 11/005,435 from Feb. 23, 2007 to Aug. 8, 2008.

Office Action History for U.S. Appl. No. 11/005,418 from Mar. 12, 2007 to Aug. 4, 2008.

Office Action History for U.S. Appl. No. 11/953,935 from Jan. 5, 2010 to Sep. 29, 2010.

Office Action History for U.S. Appl. No. 11/035,710 from Apr. 19, 2007 to Nov. 6, 2007.

Office Action History for U.S. Appl. No. 11/951,675 from Jan. 25, 2010 to Jun. 11, 2010.

Office Action History for U.S. Appl. No. 12/018,132 from Mar. 2, 2010 to Jun. 10, 2010.

Office Action History for U.S. Appl. No. 11/035,563 from Apr. 1, 2009 to Jul. 9, 2009.

Office Action for U.S. Appl. No. 12/625,071 dated Oct. 27, 2010.

Office Action History for U.S. Appl. No. 11/272,583 from Nov. 1, 2007 to Oct. 6, 2010.

Office Action History for U.S. Appl. No. 11/272,587 from Oct. 31, 2007 to Jun. 17, 2008.

Office Action History for U.S. Appl. No. 11/272,588 from Nov. 5, 2007 to Jun. 13, 2008.

Raghavan et al., "On the Reuse of Past Optimal Queries," *Proceedings of the 18th Annual International ACM SIGIR Conference on Research and Development in Information Retrieval,* Association for Computing Machinery, Inc., 1995: pp. 344-350.

Rahm et al., "A survey of approaches to automatic schema matching," *The VLDB Journal,* 2001, vol. 10: pp. 334-350.

Rys, "Bringing the Internet to Your Database: Using SQL Server 2000 and XML to Build Loosely-Coupled Systems," *17th International Conference on Data Engineering (ICDE '01)* Apr. 2001: pp. 465-472.

*The American Heritage College Dictionary,* 2004, Houghton & Mifflin, Fourth Edition: p. 977.

Wen et al., "Clustering User Queries of a Search Engine," *Proceedings of the 10th International Conference on World Wide Web,* Association for Computing Machinery, Inc., 2001: pp. 162-168.

Wen et al., "Query Clustering in the Web Context," *Information Retrivial and Clustering,* Kluwer Academic Publishers, W. Wu and H. Xiong (Eds.) 2002: pp. 1-30.

Wen et al., "Query Clustering Using User Logs," *ACM Transactions on Information Systems,* Jan. 2002, vol. 20(1): pp. 59-81.

Office Action for U.S. Appl. No. 11/226,181 dated Feb. 11, 2011.

IBM "IBM Data Discovery and Query Builder Data Abstraction Model Reference Guide", 2004, IBM, 114 pages.

Jacques Calmet, et al. "A Generic Query-Translation Framework for a Mediator Architecture" 1997, University of Karlsruhe, pp. 434-443.

J. M. Sagawa "Repository Manager Technology" IBM Systems Journal, 1990, vol. 29, Issue 2 pps. 209-227:1-19.

Panos Vassiliadis, Alkis Simitsis and Spiros Skiadopoulos "Concenptual Modelling for ETL Processes" DOLAP '02 Proceedings of the 5th ACM International Workshop on Databases, Nov. 8, 2002, McLean, VA USA, pp. 14-21: 1-8.

* cited by examiner

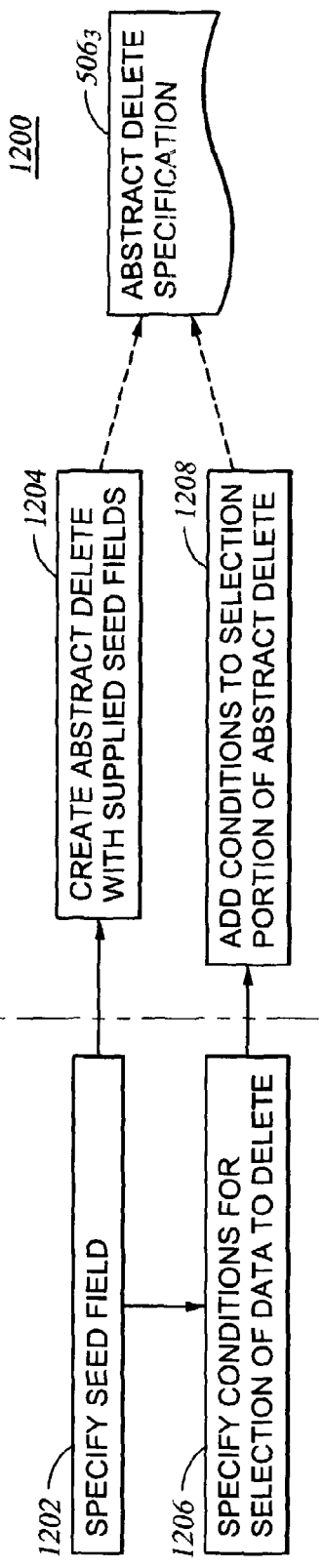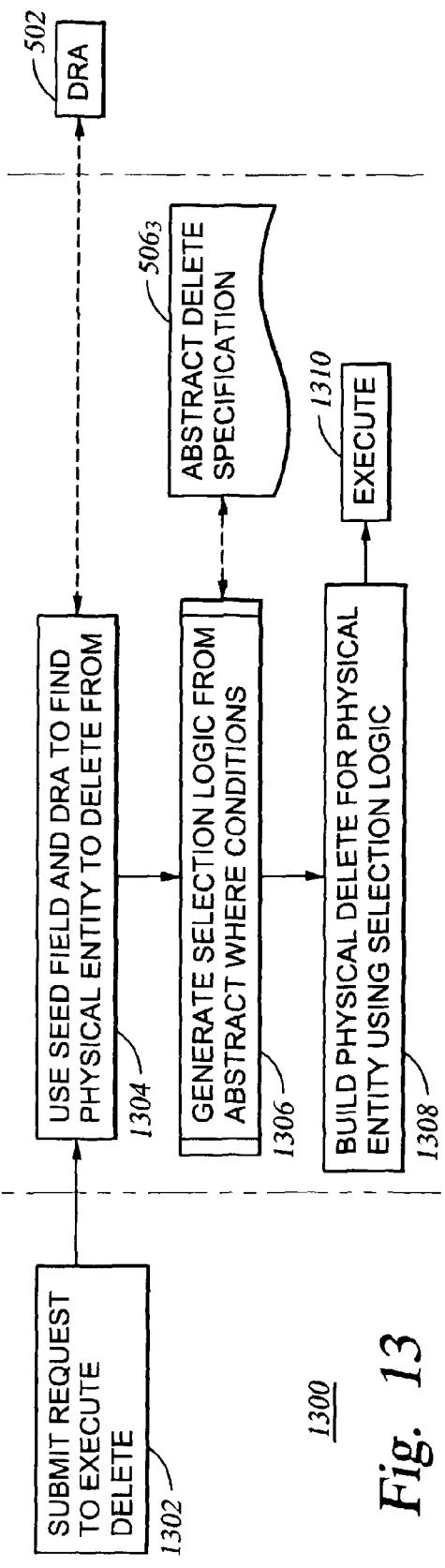

MODIFICATION OF A DATA REPOSITORY BASED ON AN ABSTRACT DATA REPRESENTATION

CROSS-REFERENCE TO RELATED APPLICATIONS

This application is a continuation-in-part, and claims priority to, the following commonly owned application: U.S. patent application Ser. No. 10/083,075, filed Feb. 26, 2002 now U.S. Pat. No. 6,996,558, entitled "IMPROVED APPLICATION FLEXIBILITY THROUGH DATABASE SCHEMA AND QUERY ABSTRACTION". This application is related to the following commonly owned applications: U.S. patent application Ser. No. 10/403,960, filed on even date herewith and entitled "SEQUENCED MODIFICATION OF MULTIPLE ENTITIES BASED ON AN ABSTRACT DATA REPRESENTATION"; U.S. patent application Ser. No. 10/132,228, entitled "DYNAMIC END USER SPECIFIC CUSTOMIZATION OF AN APPLICATION'S PHYSICAL DATA LAYER THROUGH A DATA REPOSITORY ABSTRACTION LAYER"; and U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION", which are hereby incorporated herein in their entirety.

BACKGROUND OF THE INVENTION

1. Field of the Invention

The present invention generally relates to data processing, and more particularly, to the modification of data through a logical framework.

2. Description of the Related Art

In commonly assigned U.S. patent application Ser. No. 10/083,075 (the '075 application), filed Feb. 22, 2002 entitled "Improved Application Flexibility Through Database Schema and Query Abstraction", a framework was disclosed for logically viewing physical data. The framework of the '075 application provided a requesting entity (i.e., an end-user or application) with an abstract representation of physical data. In this way, the requesting entity is decoupled from the underlying physical data to be accessed. Logical queries based on the framework can be constructed without regard for the makeup of the physical data. Further, changes to the physical data do not necessitate changes to applications accessing the physical data.

In addition to accessing abstractly represented physical data (i.e., issuing queries against the data to receive results), it is desirable to modify (i.e., insert, update and delete) data based on the abstract data representation. However, changing a data repository based on an abstract modification operation requires particular knowledge about the underlying database schema. Specifically, to implement modifications to the data based on an abstract representation of a modification operation, the physical entity affected by the modification must be identified. In addition, the modification must identify related logical fields affected by the modification.

Therefore, what is needed is the ability to modify data based on an abstract data representation.

SUMMARY OF THE INVENTION

The present invention provides a method, system and article of manufacture for defining the capabilities for inserting, updating, or deleting data in a data repository based on an abstract data representation.

One embodiment provides a method of providing a logical framework for defining abstract modification operations for modifying physical data. The method includes providing an abstract model for defining an abstract modification specification logically describing an operation to modify the data, where the abstract model includes (i) a plurality of logical fields; and (ii) a mapping rule for each of the plurality of logical fields, which map the plurality of logical fields to physical entities of the data. The method further includes providing a run-time component to transform the abstract modification specification into a physical modification specification consistent with the physical data.

Another embodiment provides a computer-readable medium containing a program which, when executed by a processor, performs an operation modifying data having a particular physical data representation in a database. The operation includes generating an abstract modification specification abstractly defining a modification operation to modify the data, wherein the abstract modification specification comprises a plurality of logical field names and corresponding values, the logical field names corresponding to physical entities of the database. The abstract modification specification is then transformed into a physical modification specification consistent with the particular physical data representation according to mapping rules which map the logical fields to the physical entities. The modification operation is then executed according to the physical modification specification, whereby the data is modified.

Yet another embodiment provides a computer-readable medium containing a program which, when executed by a processor, provides a logical framework for defining abstract modification operations for modifying physical data. The program includes an abstract model for defining an abstract modification specification logically describing an operation to modify the data. The abstract model includes (i) a plurality of logical fields; and (ii) a mapping rule for each of the plurality of logical fields, which map the plurality of logical fields to physical entities of the data. A run-time component transforms the abstract modification specification into a physical modification specification consistent with the physical data.

Still another embodiment provides a computer comprising a memory and at least one processor, and further comprising a logical framework for defining abstract modification operations for modifying physical data. The logical framework includes an abstract model for defining an abstract modification specification logically describing an operation to modify the data, where the abstract model includes: (i) a plurality of logical fields; and (ii) a mapping rule for each of the plurality of logical fields, which map the plurality of logical fields to physical entities of the data. A run-time component transforms the abstract modification specification into a physical modification specification consistent with the physical data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 12 is a flow chart illustrating a delete operation.

FIG. 13 is a flow chart illustrating the conversion of an abstract delete operation to a physical delete operation.

DETAILED DESCRIPTION OF THE PREFERRED EMBODIMENTS

Figure 1:
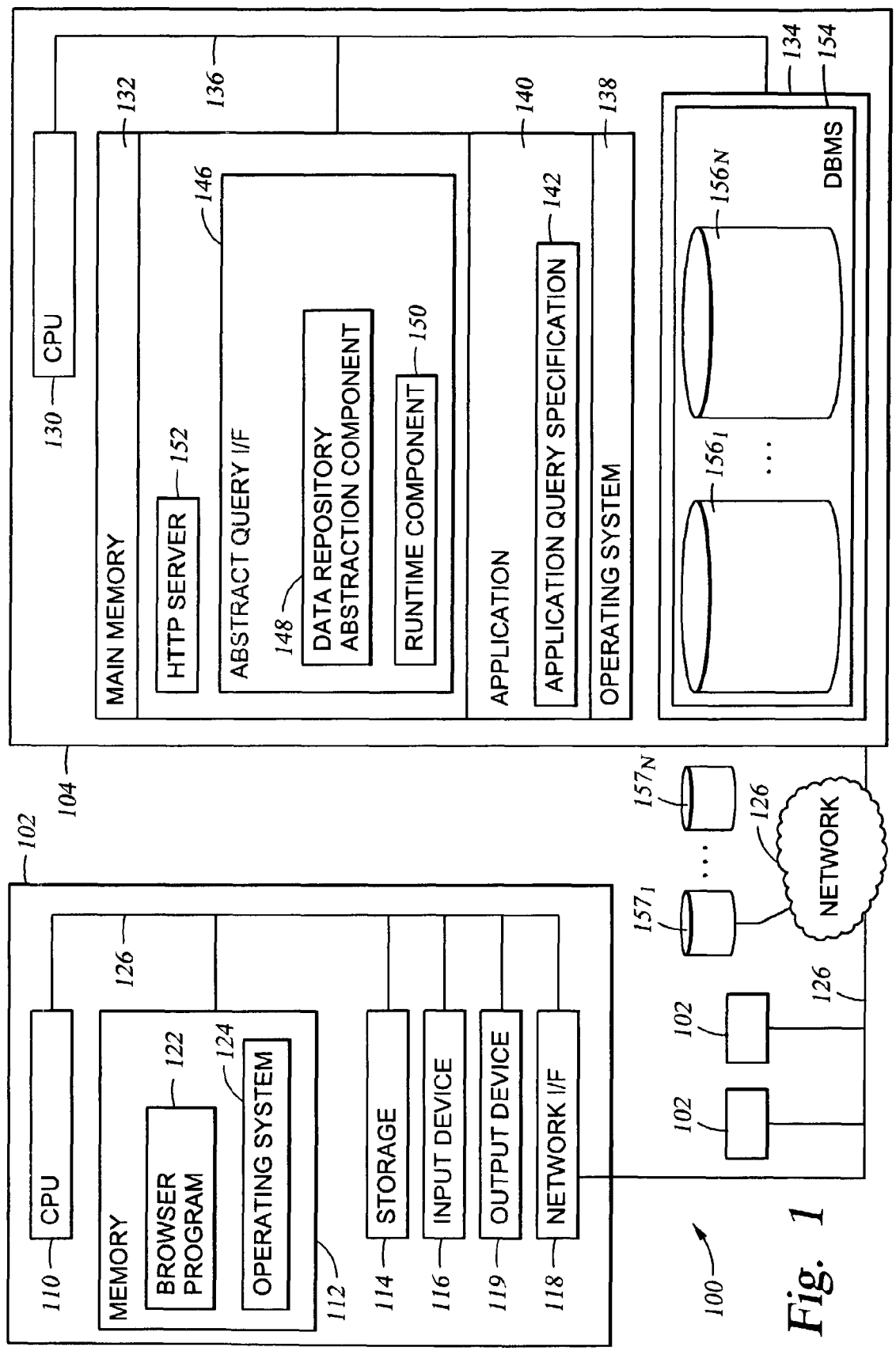
FIG. 1 is a block diagram of an illustrative computer architecture.

The present invention provides a method, system and article of manufacture for defining the capabilities for inserting, updating, or deleting data in a data repository based on an abstract data representation. By using an abstract representation of the data repository, the underlying physical representation can be more easily changed or replaced without affecting the application making the changes. Instead, the abstract data representation is changed with no changes required by the application. In addition, multiple abstract data representations can be defined to support different applications against the same underlying database schema that may have different default values or required fields.

Introduction

In one embodiment, a particular data definition framework (referred to herein as a data repository abstraction (DRA) layer/component) is provided for accessing and modifying (inserting, updating or deleting) data independent of the particular manner in which the data is physically represented. The data may be located in a single repository (i.e., source) of data or a plurality of different data repositories. Thus, the data definition framework may provide a logical view of one or more underlying data repositories.

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104 (one such server computer 104 is shown). The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 126 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative sources against which queries may be issued include local databases $156_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data which is described by a data definition framework such as the DRA described herein.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which transforms the abstract queries into a form (referred to herein as a concrete query) consistent with the physical representation of the data contained in one or more of the databases 156-157. The queries may be configured to access the data and return results, or to modify (i.e., insert, delete or update) the data. The application query specification 142 and the abstract query interface 146 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

Figure 2A:
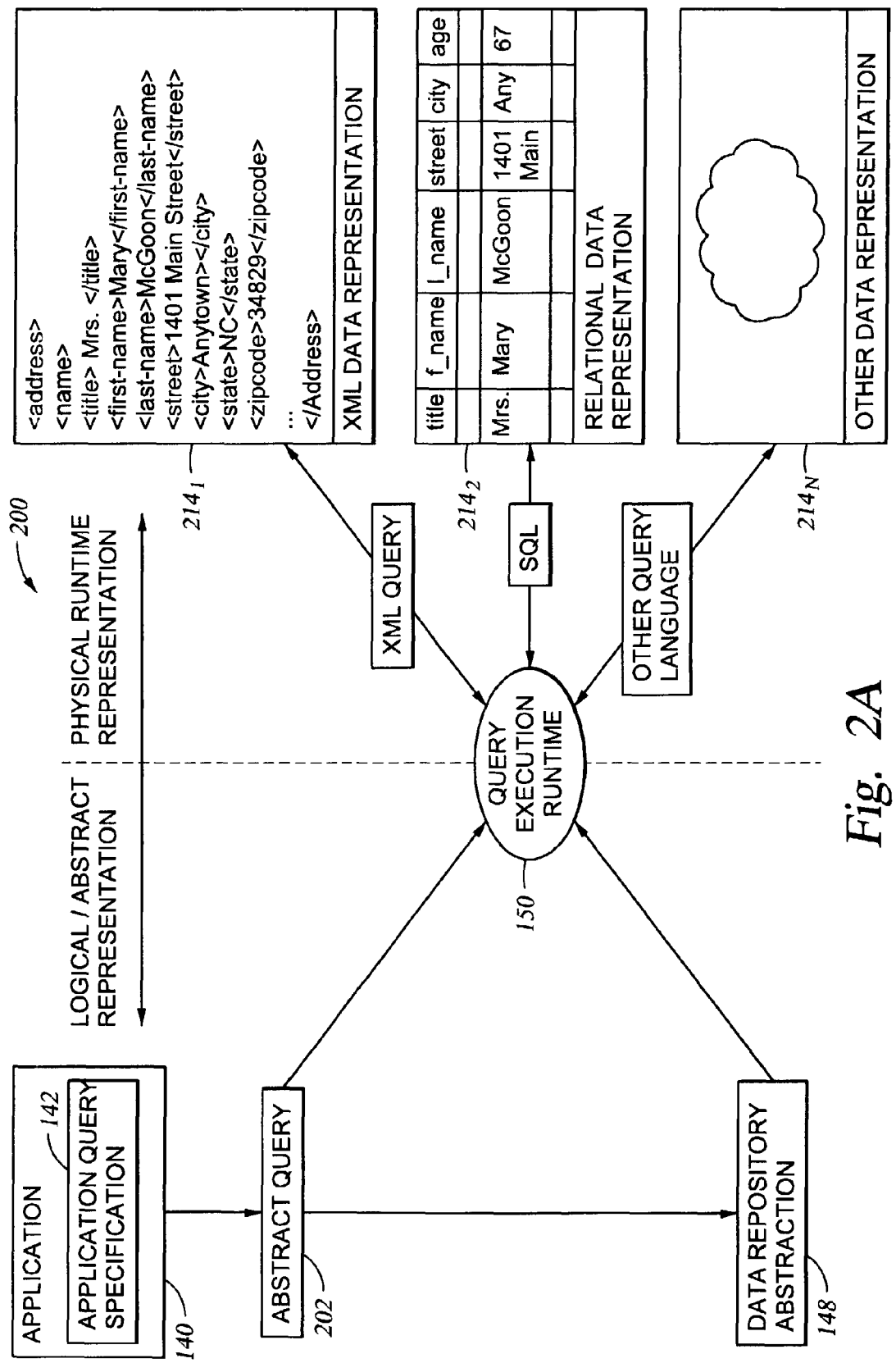
FIGS. 2A-2B are a relational view of software components of one embodiment of the invention configured to process queries against a physical data source through an abstract representation of the physical data source.
Figure 2B:
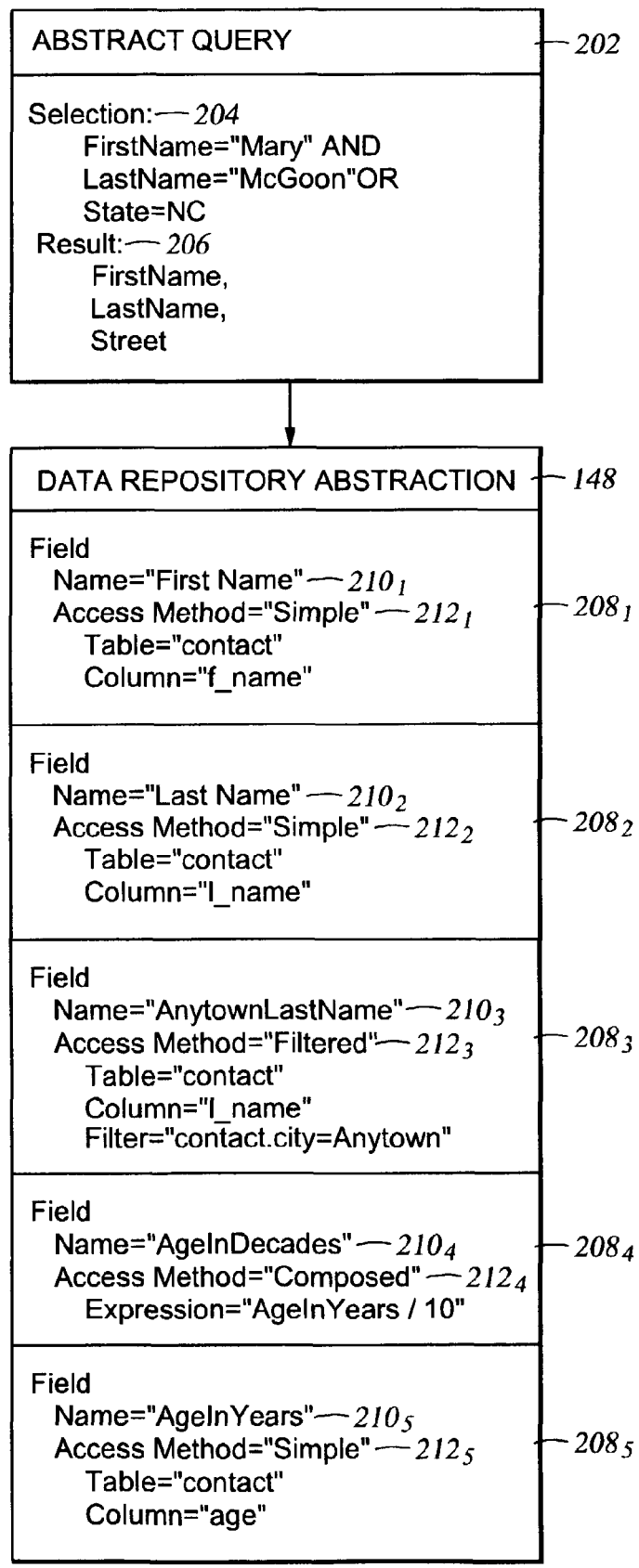

FIGS. 2A-B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation.

In general, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is noted that the data repository abstraction component 148 shown in FIG. 2B is merely illustrative of selected logical field specifications and is not intended to be comprehensive. As such, the abstract query 202 shown in FIG. 2B includes some logical fields for which specifications are not shown in the data repository abstraction component 148, such as "State" and "Street".

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2A are representative of logical fields mapped to data represented in the relational data representation $214_2$. However, other instances of the data repository abstraction component 148 map logical fields to other physical data representations, such as XML. Further, in one embodiment, a data repository abstraction component 148 is configured with access methods for procedural data representations. One embodiment of such a data repository abstraction component 148 is described below with respect to FIG. 8.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

```
001   <?xml version="1.0"?>
002   <!--Query string representation: (FirstName = "Mary" AND LastName =
003   "McGoon") OR State = "NC"-->
004   <QueryAbstraction>
005      <Selection>
006         <Condition internalID="4">
007            <Condition field="FirstName" operator="EQ" value="Mary"
```

TABLE I-continued

QUERY EXAMPLE

```
008        internalID="1"/>
009             <Condition field="LastName" operator="EQ" value="McGoon"
010        internalID="3" relOperator="AND"></Condition>
011            </Condition>
012            <Condition field="State" operator="EQ" value="NC" internalID="2"
013        relOperator="OR"></Condition>
014          </Selection>
015          <Results>
016             <Field name="FirstName"/>
017             <Field name="LastName"/>
018             <Field name="State"/>
019          </Results>
020     </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

ponent 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the

TABLE II

DATA REPOSITORY ABSTRACTION EXAMPLE

```
001    <?xml version="1.0"?>
002    <DataRepository>
003        <Category name="Demographic">
004           <Field queryable="Yes" name="FirstName" displayable="Yes">
005              <AccessMethod>
006                 <Simple columnName="f_name" tableName="contact"></Simple>
007              </AccessMethod>
008              <Type baseType="char"></Type>
009           </Field>
010           <Field queryable="Yes" name="LastName" displayable="Yes">
011              <AccessMethod>
012                 <Simple columnName="l_name" tableName="contact"></Simple>
013              </AccessMethod>
014              <Type baseType="char"></Type>
015           </Field>
016           <Field queryable="Yes" name="State" displayable="Yes">
017              <AccessMethod>
018                 <Simple columnName="state" tableName="contact"></Simple>
019              </AccessMethod>
020              <Type baseType="char"></Type>
021           </Field>
022        </Category>
023    </DataRepository>
```

Note that lines 004-009 correspond to the first field specification $208_1$ of the DRA 148 shown in FIG. 2B and lines 010-015 correspond to the second field specification $208_2$. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

Figure 3:
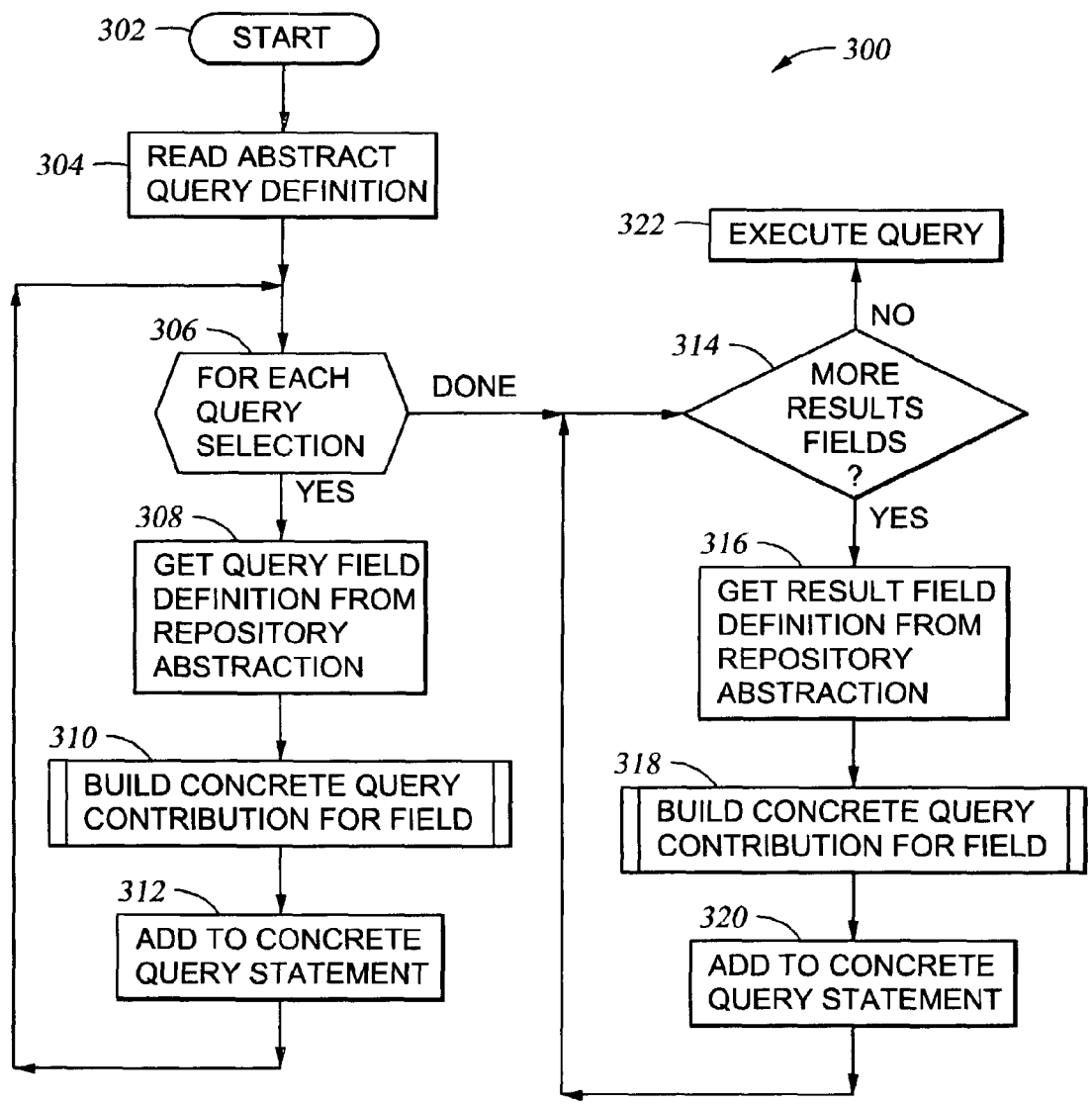
FIG. 3 is a flow chart illustrating the operation of a runtime component.

FIG. 3 shows an illustrative runtime method 300 exemplifying one embodiment of the operation of the runtime com-data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156-157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
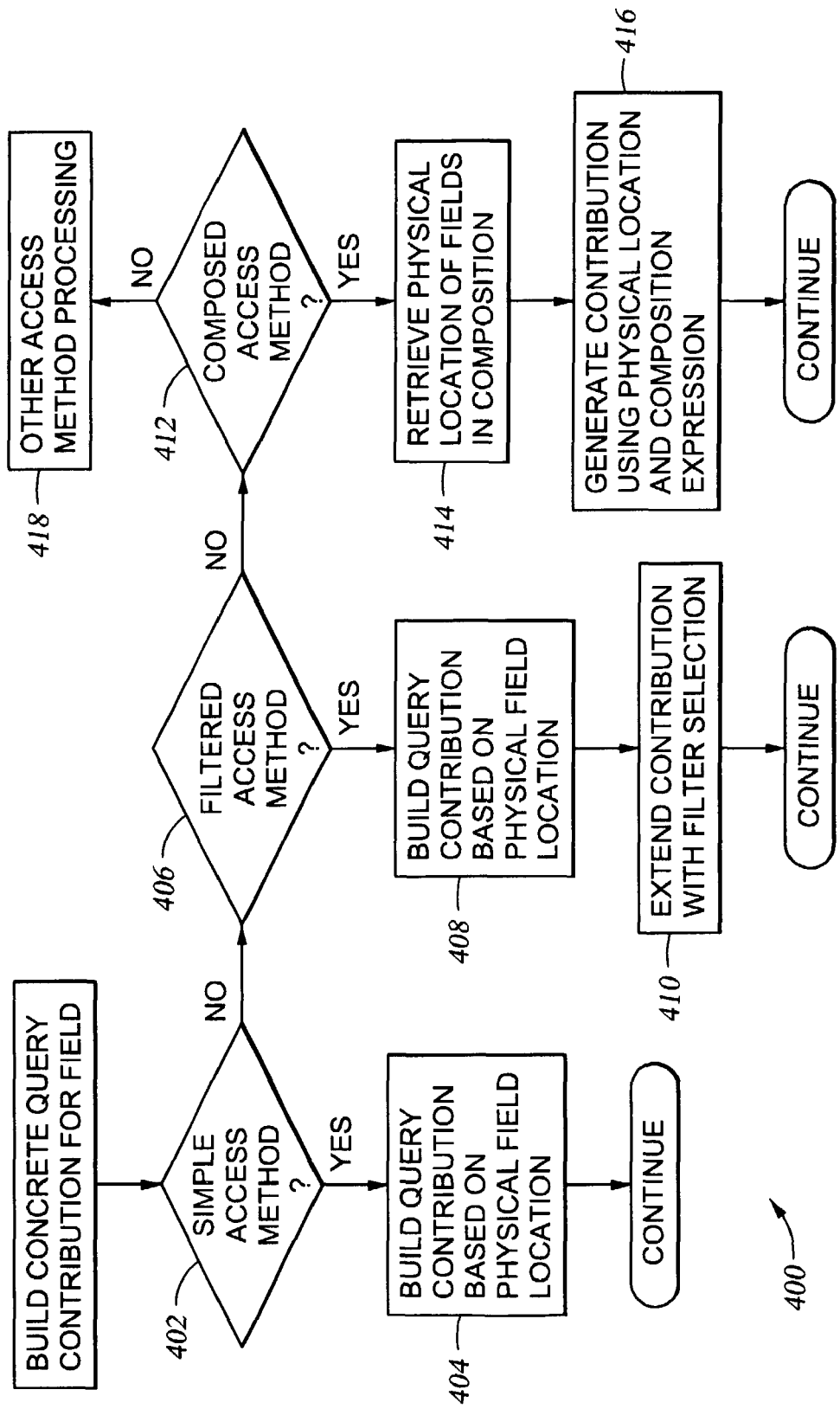
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Other Embodiments of Data Repository Abstraction Components

In one embodiment, a different single data repository abstraction component 148 is provided for each separate physical data representation 214. In an alternative embodiment, a single data repository abstraction component 148 contains field specifications (with associated access methods) for two or more physical data representations 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148. This latter embodiment is described in more detail in U.S. patent application Ser. No. 10/132,228, entitled "DYNAMIC END USER SPECIFIC CUSTOMIZATION OF AN APPLICATION'S PHYSICAL DATA LAYER THROUGH A DATA REPOSITORY ABSTRACTION LAYER" and assigned to International Business Machines, Inc., which is hereby incorporated by reference in its entirety.

In any case, a data repository abstraction component 148 contains (or refers to) at least one access method which maps a logical field to physical data. To this end, as illustrated in the foregoing embodiments, the access methods describe a means to locate and manipulate the physical representation of data that corresponds to a logical field. In one embodiment, the access methods are further configured with a location specification defining a location of the data associated with the logical field. In this way, the data repository abstraction component 148 is extended to include description of a multiplicity of data sources that can be local and/or distributed across a network environment. The data sources can be using a multitude of different data representations and data access techniques. In this manner, an infrastructure is provided which is capable of capitalizing on the distributed environments prevalent today. One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation different than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

Solutions implementing the present model use the provided abstract query specification to describe its information requirements, without regard for the location or representation of the data involved. Queries are submitted to the runtime component which uses the data repository abstraction component to determine the location and method used to access each logical piece of information represented in the query. In one embodiment, the runtime component also includes the aforementioned data caching function to access the data cache.

In one aspect, this model allows solutions to be developed independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions are made at the abstract query level and do not require addition of software that is unique for the location or representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

Modification Operations

Aspects of the invention are described above with reference to accessing data for the purpose of returning results. In the case of SQL, these are SELECTION operations. However, modification operations are contemplated, including well-known modification operations such as UPDATE, INSERT, DELETE and the like. Accordingly, the following describes embodiments extending and enhancing the functionality of the abstract framework described above to support modification operations.

Figure 5:
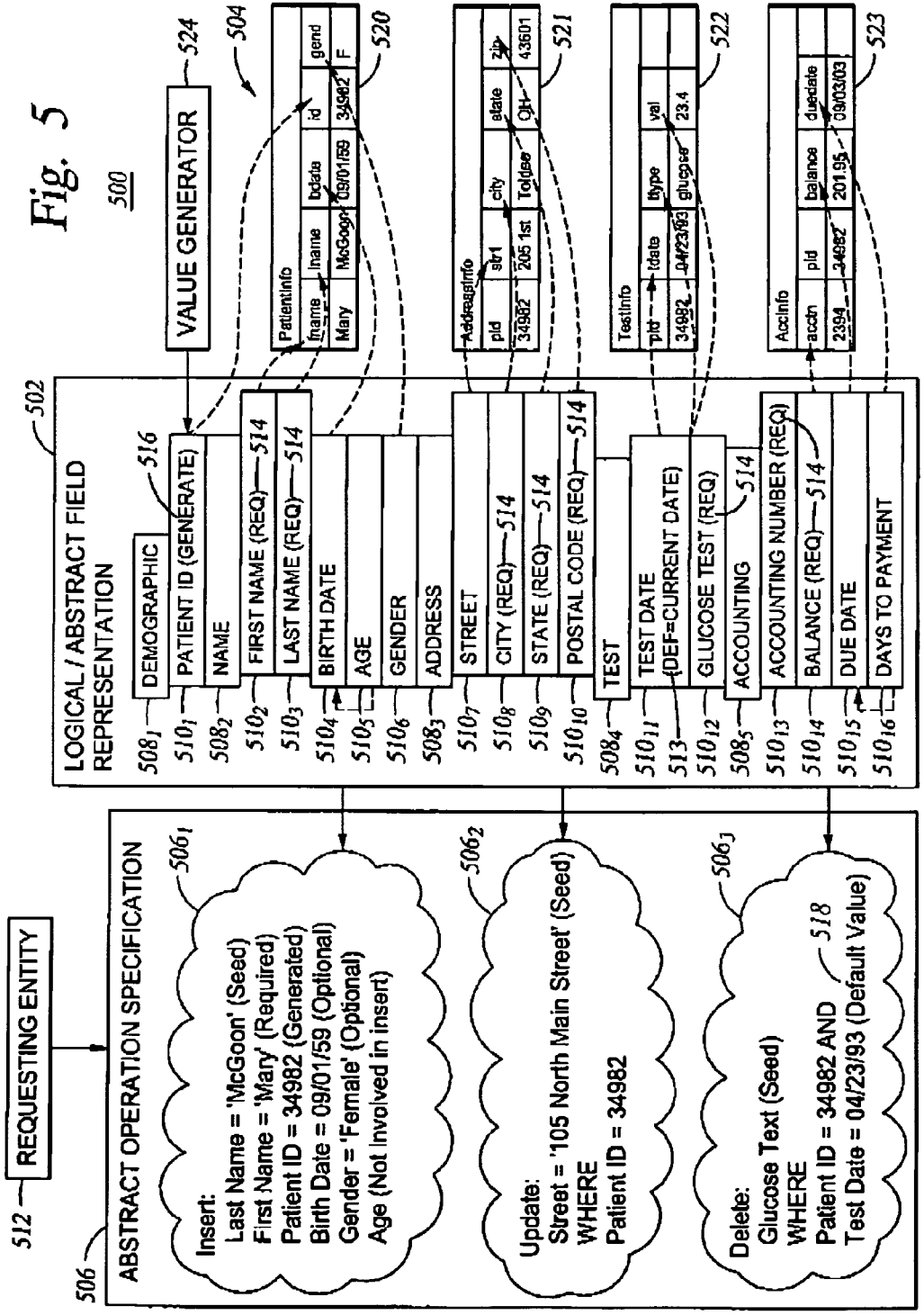
FIG. 5 is a relational view of software components of one embodiment of the invention configured to process modification operations against a physical data source through an abstract representation of the physical data source.

Referring now to FIG. 5, an environment 500 includes a representative data repository abstraction component 502 (representing a particular instance of the data repository abstraction component 148 described above) configured to support modification operations against a physical data source. By way of illustration only, the physical data source being modified via the data repository abstraction component 502 is a relational data source 504 containing a plurality of tables 520-523. However, as described above, abstract representation of any data type is contemplated.

The relational data source 504 may be modified by abstract insert operations, update operations, and delete operations (collectively, abstract modification operations). Each of the abstract modification operations is implemented according to a respective abstract operation specification, i.e., an abstract insert operation specification $506_1$, an update operation specification $506_2$ and a delete operation specification $506_3$ (collectively, abstract operation specifications 506). The abstract operation specifications 506 are composed via the data repository abstraction component 502 according to specifications provided by a requesting entity 512 (e.g., a user/application).

In general, modification of the data source 504 requires determining the physical entity of the data source 504 being modified. Having determined the physical entity, additional logical fields, representing additional physical fields within the same physical entity to be modified, can be specified. The framework of the present application will "guide" the requesting entity 512 through the related fields rather than requiring that knowledge about a database schema at the application level.

In some embodiments, a focus field is used to advantage in constructing abstract operation specifications 506, thereby ensuring that the correct operation is performed against the underlying database. For example, a focus field referred to herein as a "seed" is used to advantage in constructing an abstract insert specification $506_1$ abstract update specification $506_2$, and an abstract delete specification $506_3$. The seed is used to identify the physical entity being modified and when it is necessary to identify each of the related logical fields defining a particular entity represented in the physical data. Consider, for example, the entity of "patient". In a relational database the patient entity may be a patient information table 520 having five columns. The columns may include, for example, an "fname" column (corresponding to an individual's first name), "lname" column, (corresponding to an individual's last name) "bdate" column, (corresponding to an individual's birth date) "id" (corresponding to a patient identifier) and "gend" column (corresponding to gender). From a logical/abstract perspective, the patient entity may be defined by the "Patient ID" logical field specification $510_1$, the "First Name" logical field specification $510_2$ and the "Last Name" logical field specification $510_3$. In this case, the seed may be the "Last Name" logical field, as is illustratively represented by the abstract insert specification $506_1$ of FIG. 5. As another example, the logical field "Street" is the seed field for the abstract update specification $506_2$ of FIG. 5. The exemplary abstract delete specification $506_3$ of FIG. 5 illustrates a delete operation in which the logical field "Glucose Test" is a seed field.

In one embodiment, the seed field is determined by the requesting entity 512. That is, the first field selected by the requesting entity for a particular operation is designated as the seed field. In each case, the seed field is used to determine the physical entity to modify. In the case of the exemplary abstract insert specification $506_1$ and the abstract delete specification $506_3$ the seed field is also a required field (as specified by the data repository abstraction component 502) and are used to identify related logical fields (which in turn map to physical fields) needed to successfully implement the modification operation. In the case of insert operations, the related fields are those which will actually be modified, while in the case of delete operations the related fields are components of selection conditions needed to identify the record to delete.

Each operation will include at least one logical field, either as part of the physical entity identification criteria or as selection criteria. Each operation will include at least two logical fields for which values may (but need not be in every case) be specified, either as part of the physical entity identification criteria or as selection criteria. Generally, fields may be required or optional. "Required" means that the requesting entity must supply a value for the field because there is no suitable default value, no algorithm to generate a value and the field cannot be null. An optional field is one which does not require specification of a value by the requesting entity. Optional fields include: 1) fields that can be assigned the value of NULL; 2) fields that have an algorithm that can be used to generate a value for that field (referred to herein as "generated fields"); and 3) fields that have a defined default value in the DRA (referred to herein as "default fields"). Generated field values are generated by a value generator 524 (i.e., an algorithm). Default values are used where no name/value pair was specified for a particular field related to the entity defined by a seed field. Default values may be statically defined or generated. As an example of a generated default value, the Test Date value in the illustrative abstract delete specification $506_3$ defaults to the current date. The requesting entity (e.g., user) may be given the option of supplying a different value.

As an example of required and optional fields, consider the logical fields corresponding to the patient entity. It was noted above that the patient entity is logically defined by the "Patient ID" logical field specification $510_1$, the "First Name" logical field specification $510_2$ and the "Last Name" logical field specification $510_3$. The "First Name" logical field specification $510_2$ and the "Last Name" logical field specification $510_3$ include the required attribute and are required fields. In contrast, the other logical fields defining the patient entity (i.e., birth date and gender) are optional.

As an example, consider the case of inserts and updates to the data source 504 which provide for identification of the actual fields (i.e. columns) that are to be modified along with the new value to be put in the data source. Accordingly, a set of name/value pairs represents the fields/values within the data repository abstraction component 502 that correspond to the physical fields/values to be modified. The name represents the abstract name for the logical field that is mapped via the data repository abstraction component 502 to its underlying physical representation. The value is the abstract value to be inserted or updated in the data source for that field. In one aspect, using an abstract data model (i.e., the data repository abstraction component 502) allows for automatic conversion of abstract values to the correct physical values to be inserted into the database. For example, the data repository abstraction component 502 can be defined to use values such as "Male" and "Female" for gender when the underlying physical data repository may use values of "F" and "M" to represent those values, as illustrated by the patient information table 520, which contains a record having the value "F" in the gender (gend) column. Input values for an insert or update operation take advantage of those abstract value specifications to provide further cushion for changes to the underlying physical representation of not only the structure of the underlying data repository, but also from the physical form of the data contained within the data repository.

In many cases, an abstract field may be physically represented in multiple fields in a physical data repository. One example would be the case in the relational data source 504 where a column was defined as a foreign key to a column in another database table. For example, a patient ID may be a primary key within the patient information table 520 and may also be defined as a foreign key within the test information table 522. Although this is a typical example, an abstract relationship between two fields does not necessarily have to be enforced by a physical relationship (such as primary/foreign key) in the underlying data repository. Using metadata about the relationship between the two physical locations (i.e., relationship between column(s) in a first table to column(s) in a second table), a single field within the abstract data representation can be used to handle both physical locations for the field. The application is shielded from the knowledge of the various places a particular value is used within the database schema.

Special considerations must be taken into account when these related fields are included on an insert, update, or delete operation. When performing an insert operation, the runtime/DRA logic must recognize the various physical representations for the single abstract data field. The correct physical representation must be used based on the focus item of the insert operation. For example, if the patient identifier was represented as column "ID" in the patient information table 520 and as column "PID" in the test information table 522, the correct column name must be identified based on the table defined for the insert operation by the focus item. Additionally, these additional forms of the physical representation must be taken into account when determining default values and required values for the insert operation. For example, if the focus item identified that the underlying physical table for the operation was the test information table 522, the runtime/DRA logic must recognize that the abstract patient ID field must be considered when looking for default and required values.

Additional considerations must be given to update and delete operations when dealing with abstract fields that represent multiple locations in the physical data repository to ensure that data integrity is maintained. The underlying data repository may enforce additional restrictions on these types of fields. Relational databases provide aspects such as restricting updates or deletes to columns defined with a primary key/foreign key relationship or cascading those updates and deletes through the foreign key tables. That is, a delete against a primary table such as the patient information table 520 could be set up to indicate that the delete should cascade and delete the corresponding rows from the test information table 522 based on the primary key/foreign key relationship based on patient ID. Using an abstract representation of the data repository, the implementation can choose whether to restrict these operations or attempt to propagate the changes through the various physical entities based on the definition of the relationships for the abstract field.

In order to implement the above-described features and aspects, the data repository abstraction component 502 is configured with a plurality of attributes, which are now described.

Initially, it is noted that the details described above with respect to the data repository abstraction component 148 in FIG. 2B are applicable to the abstraction component 502 shown in FIG. 5, but have not been shown for convenience and simplicity, and to facilitate emphasis of additional attributes. In other cases, representation of attributes has been simplified. For example, reference to logical fields used in defining composed fields is represented by arrows, such as in the case of the "Age" logical field specification $510_5$ and the "Days to Payment" logical field specification $510_{16}$. The abstraction component 502 defines a plurality of categories including Demographic $508_1$, Name $508_2$, Address $508_3$, Test $508_4$ and Accounting $508_5$ (collectively, categories 508). Each of the categories 508 relates two or more logical fields $510_{1-16}$. Selected logical fields are configured with attributes used in composing abstract operation specifications 506. Such attributes include a "Required" attribute, a "Generate" attribute and a "Default Value" attribute. For example, the "First Name" logical field specification $510_2$, the "Last Name" logical field specification $510_3$, the "City" logical field specification $510_8$, the "State" logical field specification $510_9$, the "Postal Code" logical field specification $510_{10}$, the "Glucose Test" logical field specification $510_{12}$, the "Account Number" logical field specification $510_{13}$ and the "Balance" logical field specification $510_{14}$ are configured with the "Required" attribute 514. The "Patient ID" logical field specification $510_1$ is configured with the "Generate" attribute 516 and the Test Date logical field specification $510_{11}$ is configured with the "Default Value" attribute 518, where the default value is specified as "Current_Date".

Preferably, one data repository abstraction component 502 is provided for all modifications (i.e., insert, update and delete). However, it is contemplated that a separate data repository abstraction component may be provided for each abstract modification operation.

Figure 6:
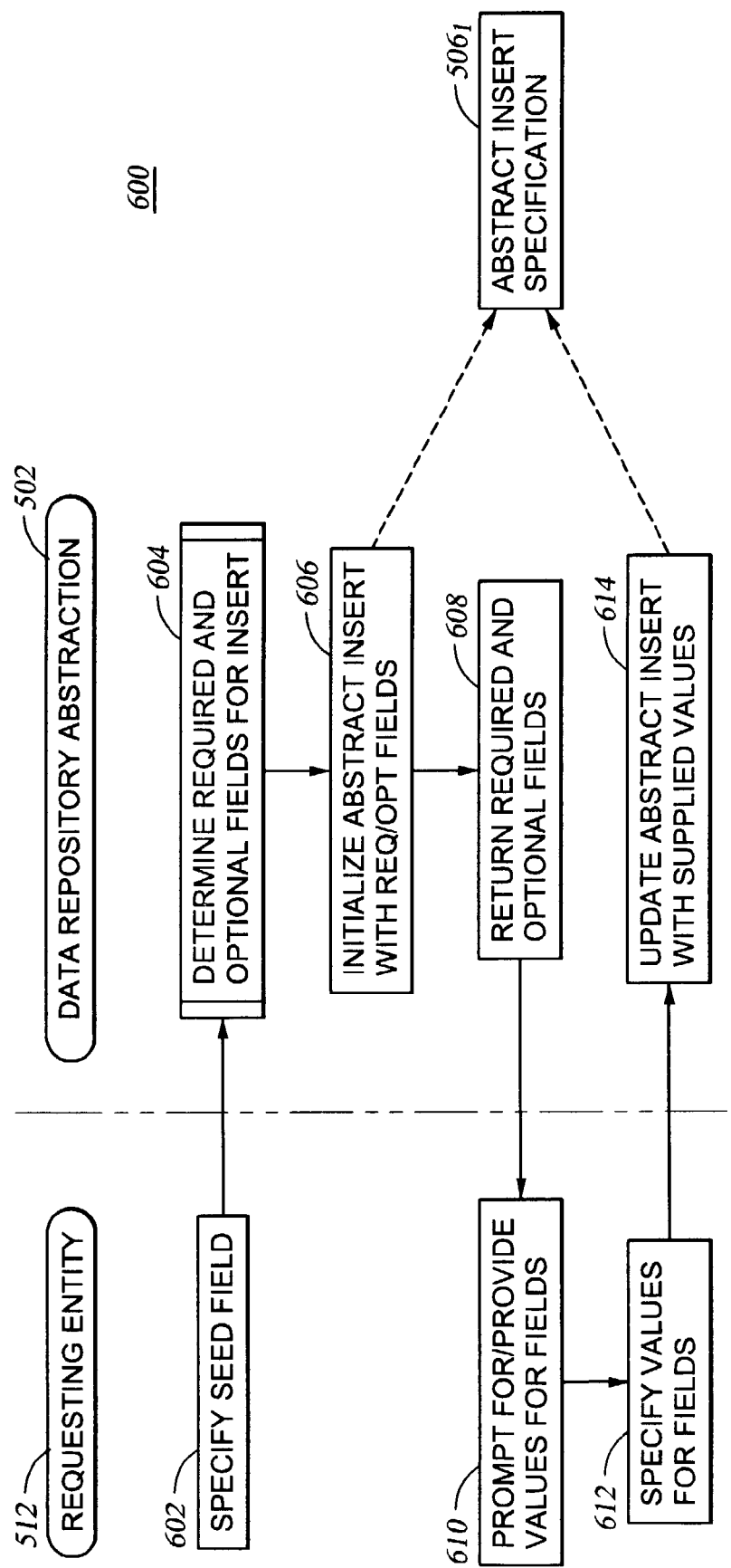
FIG. 6 is a flow chart illustrating an insert operation.

Referring now to FIG. 6, a method 600 illustrates the interaction between requesting entity 512 and the data repository abstraction component 502 in the case of composing an abstract insert specification. For purposes of illustration it will be assumed that the requesting entity 512 is representative of the application 140 (FIG. 1), which receives input from a user via a user interface (e.g. the browser program 122 FIG. 1). Initially, the user specifies a seed field (step 602). The data repository abstraction component 502 is then invoked to determine required and optional fields for the insert operation (step 604). An illustrative representation of the processing occurring at step 604 is described below with reference to FIG. 7. Having made the determination at step 604, an abstract insert specification $506_1$ is initialized with the required and optional fields (step 606). The required and optional fields are then returned to the requesting entity (step 608), which prompts the user to provide values for each of the fields (step 610). Well-known techniques in the art of user interfaces may be used to identify and distinguish for the user required fields and optional fields. For example, required fields may be highlighted in red, marked with an asterisk, or include a parenthetical comment indicating that the field is required. In an alternative embodiment, the application 140 itself may provide all or some of the values. Once values for at least each of the required fields (and any optional fields) has been specified (step 612), the abstract insert specification $506_1$ is populated with the specified values (step 614).

Figure 7:
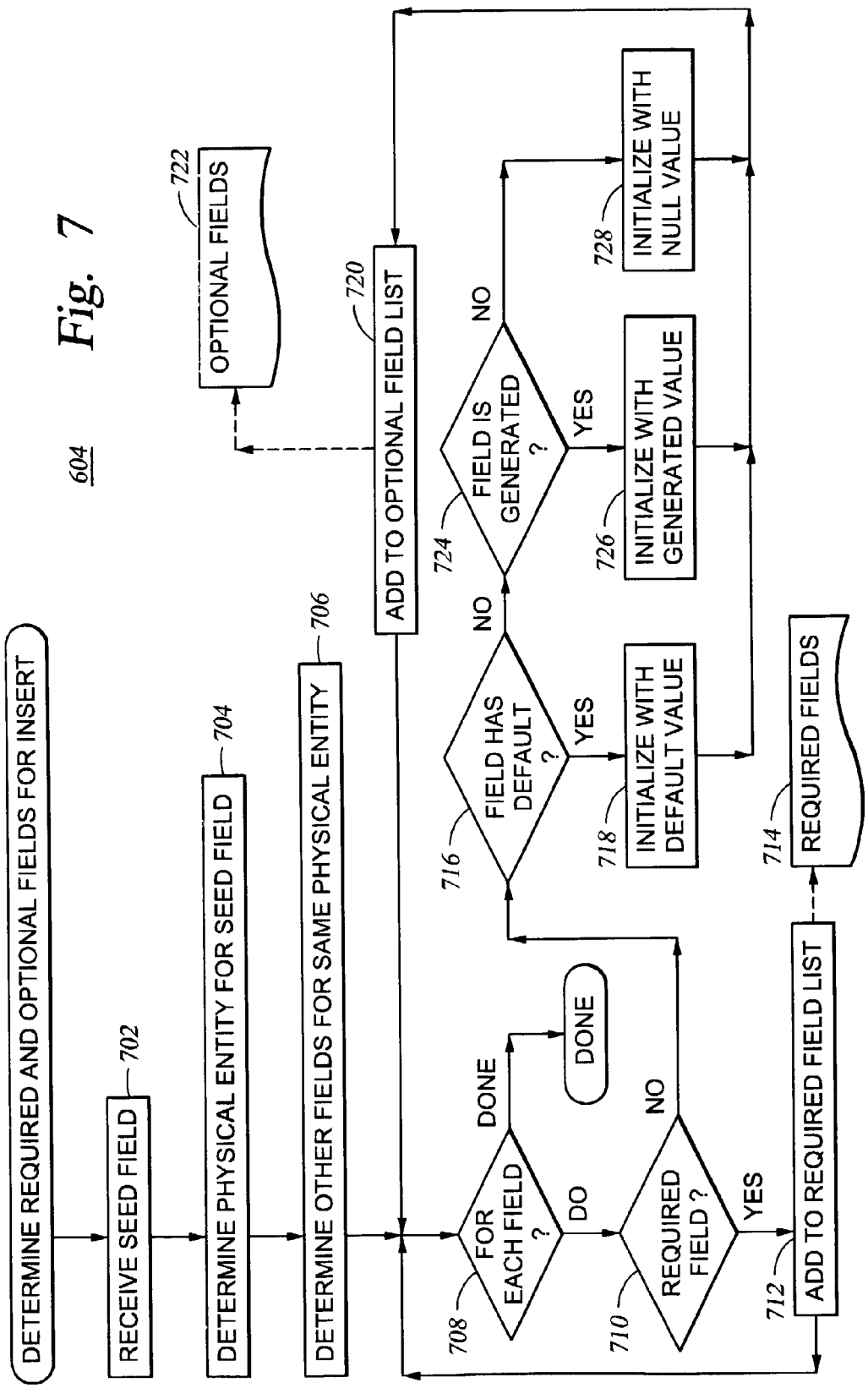
FIG. 7 is a flow chart illustrating the determination of required and optional fields in an insert operation.

Referring now to FIG. 7, one embodiment of step 604 for determining required and optional fields is shown. Upon determining the seed field (step 702) specified by the requesting entity 512 (at step 602 of FIG. 6), the appropriate logical field specification of the data repository abstraction component 502 is referred to in order to determine the physical entity (e.g., a table in the relational data source 504 shown in FIG. 5) corresponding to the seed field (step 704). In the case of an insert operation, the seed field is also used to determine other related logical fields for the identified physical entity corresponding to the seed field (step 706).

A loop is then entered (at step 708) for the seed field and each of the related fields which define the physical entity referenced by the seed field. In particular, processing is performed to determine whether the field is a required field (at step 710), whether the value for the field is a default value (step 716), or whether the field value is generated (step 724). The field type is determined according to the attribute (i.e., the required attribute 514, the generate attribute 516 or the default attribute 518) present in the logical field specification. If the field is required (step 710), the field is added (step 712) to a required field list 714. In the case of a default attribute (step 716), the field value is initialized with a default value (step 718). Where the logical field specification includes a generate attribute 518 (step 724), the field is initialized with a generated value (step 726). In the case of both generated values and default values, the corresponding fields are added (step 720) to an optional fields list 722. If the field is not defined as any one of required, default or generated, then the field is initialized with a NULL value (step 728) and then added (step 720) to the optional field list 722. Once each identified related field is processed according to loop entered at step 708, the required fields list 714 and optional fields list 722 are provided to the requesting entity 512 at step 608 of FIG. 6.

Figure 8:
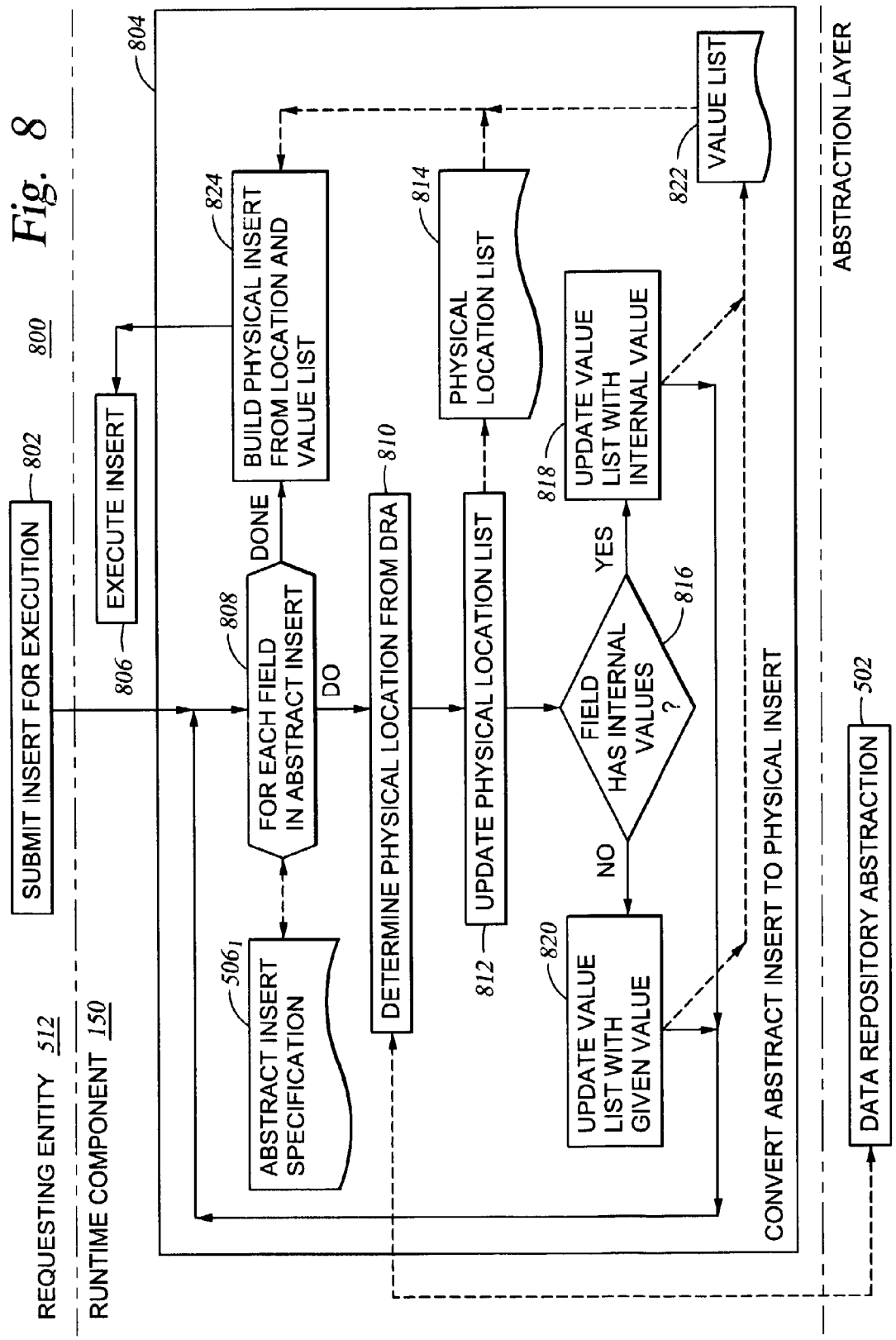
FIG. 8 is a flow chart illustrating the conversion of an abstract insert operation to a physical insert operation.

Having composed the abstract insert specification $506_1$, the insert operation may be executed. FIG. 8 shows one embodiment of a method 800 for executing the insert operation according to the abstract insert specification $506_1$. Upon submission of a request to execute the insert from the requesting entity 512 (step 802), the run-time component 150 (described above with reference to FIG. 1) is invoked convert the abstract insert specification $506_1$ to a physical insert operation (step 804). The physical insert operation is then executed (step 806).

FIG. 8 shows one embodiment of a process for conversion of the abstract insert into a physical insert. In particular, the run-time component enters a loop (step 808) for each logical field in the abstract insert specification 5061. For a given logical field, the physical location of the field is determined from the data repository abstraction component 502 (step 810). A physical location list 814 is then updated with the determined physical location (step 812). In some cases, the logical field may have an internal value (determined at step 816). That is, the value of the logical field may be different from the value for the physical field. For example, the logical field name may be "Male" while the physical field name is "M." In this case, the value must be made consistent with physical value. This is done by updating a value list 822 with the internal value (step 818). If the field values are not different (i.e., step 816 is answered negatively), the value list 822 is updated with the given value for the physical field (step 820).

Once the processing for the loop entered at step 808 has been performed for each logical field in the abstract insert specification $506_1$, the physical insert is built from the location list 814 and the value list 822 (step 824). The physical insert operation is then executed (step 806).

Figure 9:
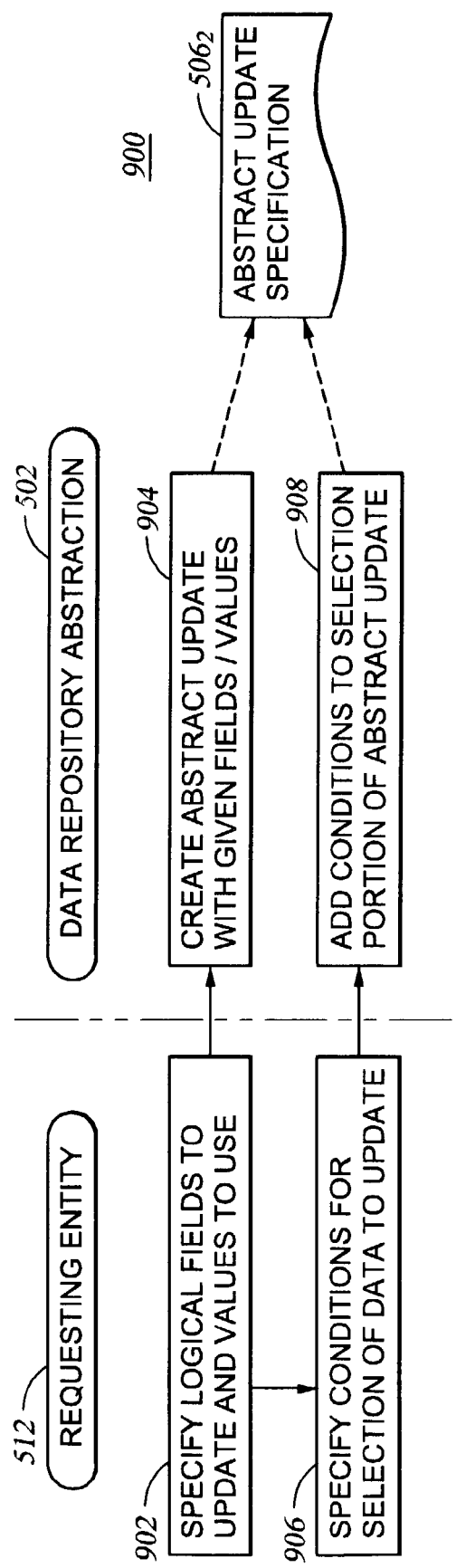
FIG. 9 is a flow chart illustrating an update operation.

Referring now to FIG. 9 an abstract update method 900 is described. Generally, the abstract update method 900 describes the interaction between the requesting entity 512 and the data repository abstraction 502, which implements the abstract update. Initially, the requesting entity 512 specifies logical fields to update and values to use (step 902). The fields and values may be provided to the requesting entity 512 by a user through a user interface. The data repository abstraction component 502 creates an abstract update specification $506_2$ according to the specified logical fields and values (step 904). The requesting entity 512 then provides (at step 906) the data repository abstraction component 502 conditions for selection of data to update (referred to herein as selection conditions). The selection conditions are added to the selection portion of the abstract update (step 908). A fully composed abstract update specification $506_2$ is now ready for conversion to a physical operation, and subsequent execution.

Figure 10:
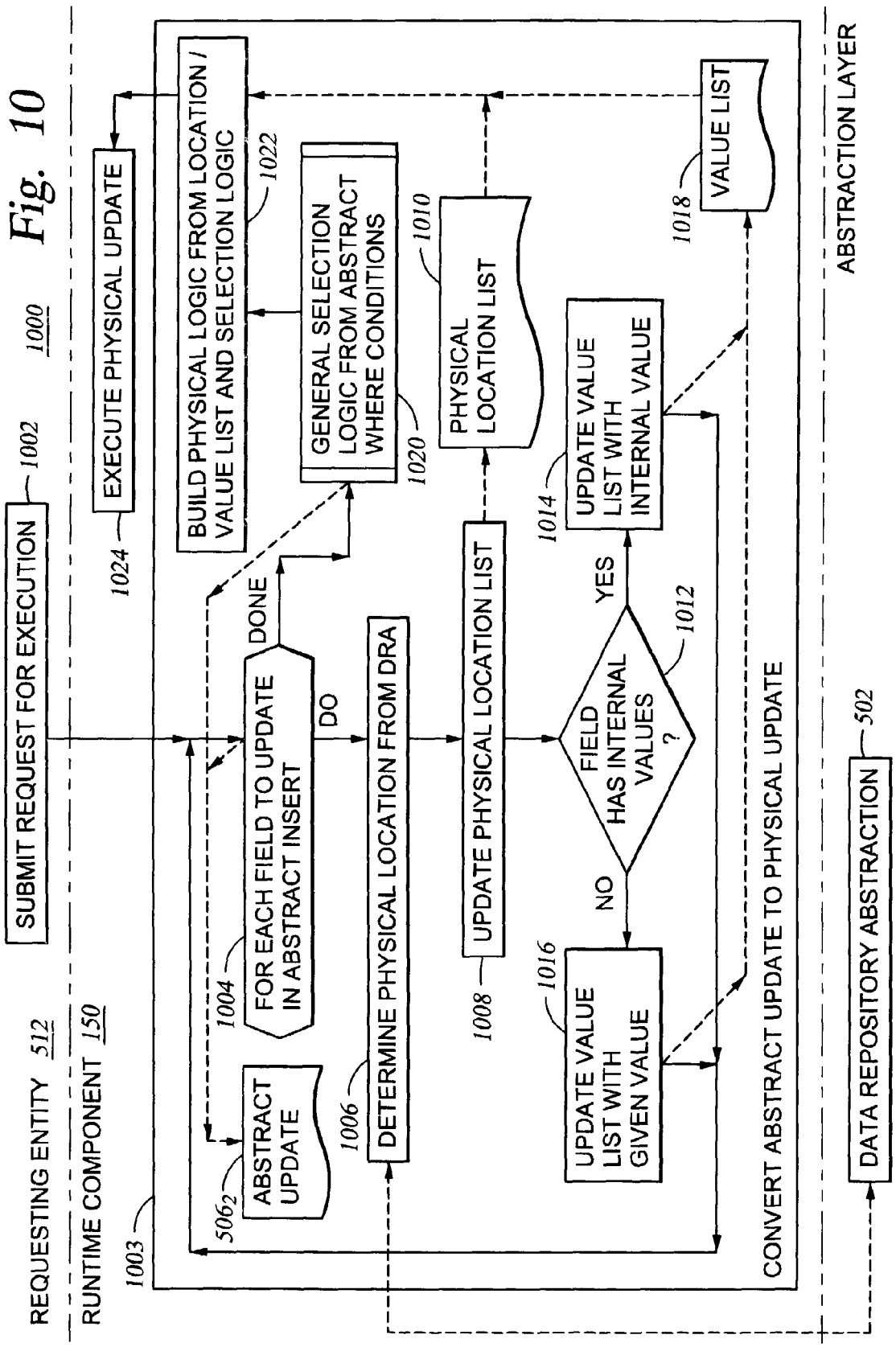
FIG. 10 is a flow chart illustrating the conversion of an abstract update operation to a physical update operation.

One embodiment illustrating a method 1000 of converting, and then executing, the abstract update is described with reference to FIG. 10. The method 1000 is initiated by the requesting entity 512 which submits a request to execute the abstract update to the run-time component 150 (step 1002). The run-time component 150 then performs processing to convert the abstract update to a physical update (step 1003). The conversion process includes a loop performed for each field to update as specified by the abstract update specification $506_2$ (step 1004). The run-time component 150 then determines the physical location corresponding to the logical field from the data repository abstraction component 502 (step 1006). A physical location list 1010 is then updated to reflect the physical location of the logical field (step 1008). If the logical field has an internal value (determined at step 1012), a value list 1018 is updated with the internal value for the field (step 1014). Otherwise, the value list 1018 is updated with the given value for the field (step 1016).

Once each of the logical fields to be updated are processed according to the loop entered at step 1004, selection logic is generated from the abstract selection (WHERE) conditions of the abstract update specification $506_2$ (step 1020). The run-time component 150 then builds a physical update specification from the physical location list 1010, the value location list 1018 and the selection logic (step 1022). The physical update is then executed (step 1024).

Figure 11:
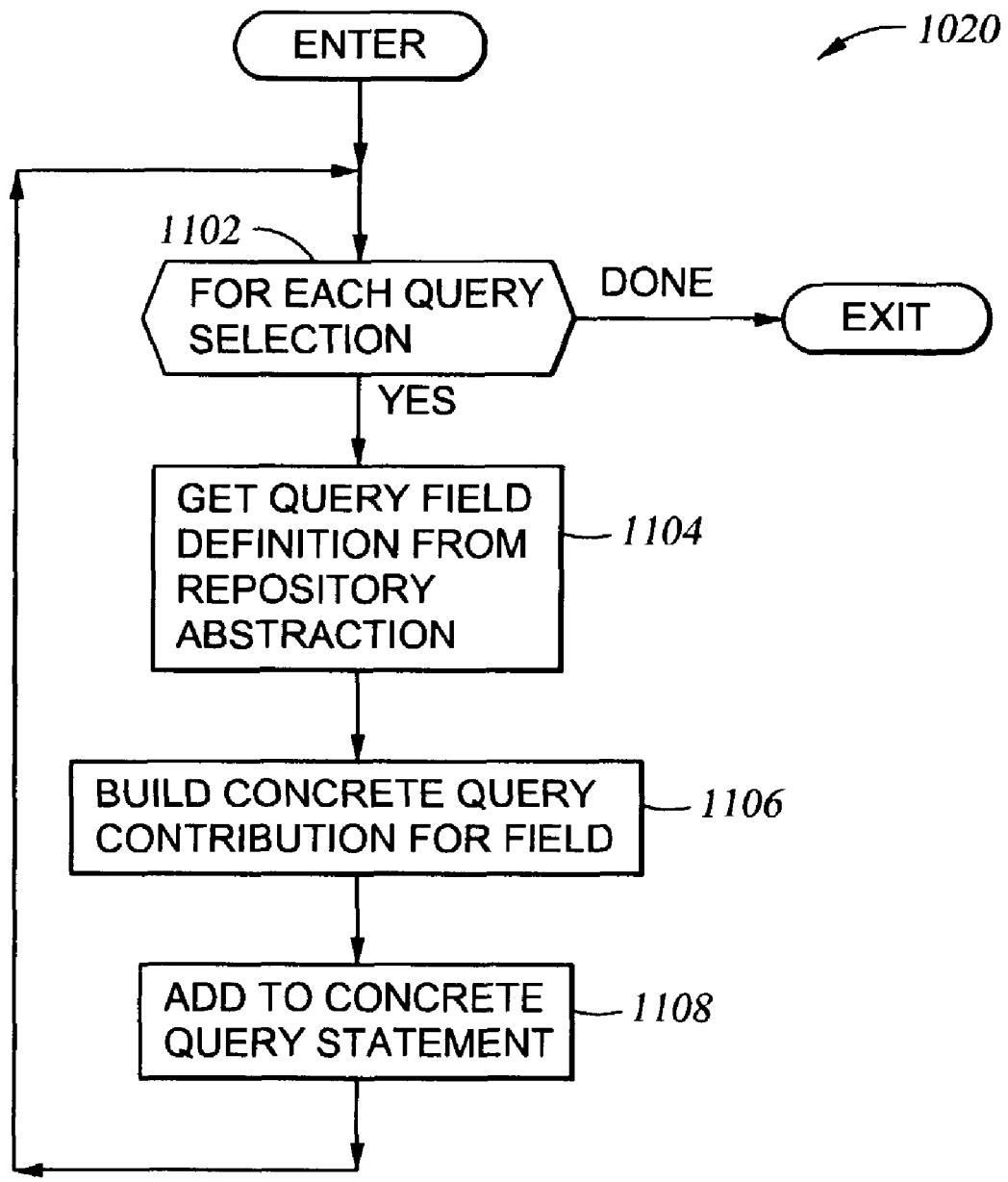
FIG. 11 is a flow chart illustrating the generation of selection logic for an abstract update operation.

One embodiment for generating the selection logic at step 1020 of the method 1000 is shown in FIG. 11. It is noted that step 1020 substantially involves performing steps 306, 308, 310 and 312 of FIG. 3. Accordingly, for each selection criterion (step 1102), the specified field definition is retrieved from the abstraction component 502 (step 1104). A concrete/physical selection contribution is built (step 1106) and then added to the selection portion of the update statement (step 1108). The logic for building the concrete/physical selection contribution is substantially the same as was described for queries with respect to FIG. 4 and, therefore, will not be described again in detail here.

Referring now to FIG. 12 an abstract delete method 1200 is described. Generally, the method 1200 describes the interaction between the requesting entity 512 and the data repository abstraction 502, which implements the abstract delete. As in each of the previous abstract modification operations, the abstract delete requires composing an abstract specification. To this end, the requesting entity 512 specifies a seed field (step 1202) which the data repository abstraction component 502 uses to create abstract delete logic of the abstract delete specification $506_3$ (step 1204). The requesting entity 512 then provides selection conditions for selection of data to delete (step 1206). The selection conditions are added to the selection portion of the abstract delete specification $506_3$ (step 1208).

The abstract delete specification is then used by the run-time component 150 to generate a physical delete specification. One conversion method 1300 for converting the abstract delete to a physical delete, is described with reference to FIG. 13. The conversion process is initiated when the requesting entity 512 submits a request to execute the delete operation (step 1302). The run-time component 150 uses the seed value (specified by the requesting entity 512 at step 1202) and the data repository abstraction component 502 to locate the physical entity to delete from (step 1304). In particular, the logical field specification of the data repository abstraction component 502 corresponding to the seed field is identified. The identified logical field specification provides the necessary logic (i.e., the appropriate access method) to access the physical entity to delete from. The run-time component 150 then generates selection logic according to the selection conditions specified in the abstract delete specification $506_3$ (step 1306). One embodiment for generating the selection logic is described with reference to FIG. 11. FIG. 11 was described above in the context of an update operation. Because the processing for a delete operation is substantially similar, the details of FIG. 11 are not described again with respect to a delete operation. Using the determined physical entity and the generated selection logic, the run-time component 150 builds a physical delete specification (step 1308). The physical delete is then executed (step 1310).

While the foregoing is directed to embodiments of the present invention, other and further embodiments of the invention may be devised without departing from the basic scope thereof, and the scope thereof is determined by the claims that follow.

What is claimed is:

1. A computer-implemented method of providing a logical framework for defining abstract modification operations for modifying data in a physical database, comprising:

retrieving a modification operation specification specifying at least one logical field used as part of one of physical entity identification criteria or selection criteria in performing an abstract modification operation, wherein the modification operation comprises one of an insert operation and an update operation and wherein generating the abstract query, comprises:

(i) when the modification operation comprises an insert operation:

specifying a logical seed field;

upon determining that one or more additional logical fields are required for performing the insert operation based on the logical seed field, receiving values for each of the required logical fields;

(ii) when the modification operation is an update operation:
specifying a logical field to update and a corresponding update value,
creating an abstract update expression using the specified logical field to update and the corresponding update value,
specifying a selection condition for selecting data in the database to update, and
adding the selection condition to the abstract update expression;
providing an abstract model for defining an abstract query describing an instance of the abstract modification operation performed to modify the data in the physical database, the abstract model comprising:
a plurality of logical fields, each comprising a logical field name; and a mapping rule for each of the plurality of logical fields, which map the plurality of logical fields to data in the physical database, wherein each mapping rule is selected from at least two different mapping rule types; and
providing a run-time component to transform the abstract query into a executable query consistent with the physical database.

2. The method of claim 1, wherein the abstract query comprises a plurality of logical field names and corresponding values.

3. The method of claim 1, further comprising:
issuing, by a requesting entity, a request to execute the abstract query; and
transforming, by the run-time component, the abstract query into the executable query consistent with the physical database.

4. A non-transitory computer-readable medium containing a program which, when executed by a processor, performs an operation of modifying data stored in a database, the operation comprising:
retrieving a modification operation specification specifying at least one logical field used as part of one of physical entity identification criteria or selection criteria in performing the abstract modification operation, wherein the modification operation comprises one of an insert operation and an update operation and wherein generating the abstract query, comprises:
(i) when the modification operation comprises an insert operation:
specifying a logical seed field,
upon determining that one or more additional logical fields are required for performing the insert operation based on the logical seed field, receiving values for each of the required logical fields;
(ii) when the modification operation is an update operation:
specifying a logical field to update and a corresponding update value,
creating an abstract update expression using the specified logical field to update and the corresponding update value,
specifying a selection condition for selecting data in the database to update, and
adding the selection condition to the abstract update expression;
generating an abstract query specifying the modification operation to modify data in the database, wherein the abstract query comprises a plurality of logical field names and corresponding values, wherein the plurality of logical field names are items of definitions of logical fields defined in a logical data model, and wherein each of the logical field definitions further include at least one location attribute identifying a location of physical data corresponding to the logical field name of the respective logical field definition, and a reference to an access method selected from at least two different access method types, and wherein the access methods map the respective logical fields to physical entities of the database;
transforming the abstract query an executable query consistent with the particular physical data representation according to the access method specified by each logical field included in the abstract query; and
executing the executable query, whereby data in the database corresponding to the logical fields is modified.

5. The computer-readable medium of claim 4, wherein the abstract query comprises at least one logical field corresponding to a physical entity to be modified and selection criterion for locating the physical entity to be modified.

6. The computer-readable medium of claim 4, wherein transforming the abstract query comprises determining a corresponding physical location of data in the database for each required logical fields and the logical seed field.

7. The computer-readable medium of claim 4, wherein transforming the abstract query comprises determining a corresponding physical location of data for the specified logical field.

8. A non-transitory computer-readable medium containing a program which, when executed by a processor, performs an operation of modifying data stored in a database, the operation comprising:
retrieving a modification operation specification specifying at least one logical field used as part of one of physical entity identification criteria or selection criteria in performing the abstract modification operation, wherein the modification operation is a delete operation and wherein generating the abstract query, comprises:
specifying a logical seed field to delete,
creating an abstract delete expression using the specified logical seed field,
specifying a selection condition for selecting data to delete, and
adding the selection condition to the abstract delete expression;
generating an abstract query specifying the modification operation to modify data in the database, wherein the abstract query comprises a plurality of logical field names and corresponding values, wherein the plurality of logical field names are items of definitions of logical fields defined in a logical data model, and wherein each of the logical field definitions further include at least one location attribute identifying a location of physical data corresponding to the logical field name of the respective logical field definition, and a reference to an access method selected from at least two different access method types, and wherein the access methods map the respective logical fields to physical entities of the database;
transforming the abstract query an executable query consistent with the particular physical data representation according to the access method specified by each logical field included in the abstract query; and
executing the executable query, whereby data in the database corresponding to the logical fields is modified.

9. The computer-readable medium of claim 8, wherein transforming the abstract query comprises determining a corresponding physical location of data for the specified logical seed field.

10. A non-transitory computer-readable medium containing a program which, when executed by a processor, provides a logical framework for defining abstract modification operations for modifying physical data in a physical database, the program comprising:
an abstract modification operation specification specifying at least one logical field used as part of one of physical entity identification criteria or selection criteria in performing the abstract modification operation, wherein the abstract modification operation comprises one of an insert operation and an update operation and wherein generating the abstract query, comprises:
(i) when the abstract modification operation comprises an insert operation:
specifying a logical seed field,
upon determining that one or more additional logical fields are required for performing the insert operation based on the logical seed field, receiving values for each of the required logical fields;
(ii) when the abstract modification operation is an update operation:
specifying a logical field to update and a corresponding update value,
creating an abstract update expression using the specified logical field to update and the corresponding update value,
specifying a selection condition for selecting data in the database to update, and
adding the selection condition to the abstract update expression;
an abstract model for defining an abstract query describing an instance of the abstract modification operation performed to modify the data in the physical database, the abstract model comprising:
(i) a plurality of logical fields, each logical field comprising a logical field name; and
(ii) a mapping rule for each of the plurality of logical fields, which map the plurality of logical fields to data in the physical database, wherein each mapping rule is selected from at least two different mapping rule types; and
a run-time component to transform the abstract query into a executable query consistent with the physical database.

11. A computer comprising a logical framework for defining abstract modification operations for modifying physical data in an existing physical database, the logical framework comprising:
a memory and at least one processor;
an abstract modification operation specification specifying at least one logical field used as part of one of physical entity identification criteria or selection criteria in performing the abstract modification operation, wherein the abstract modification operation comprises one of an insert operation and an update operation and wherein generating the abstract query, comprises:
(i) when the abstract modification operation comprises an insert operation:
specifying a logical seed field,
upon determining that one or more additional logical fields are required for performing the insert operation based on the logical seed field, receiving values for each of the required logical fields;
(ii) when the abstract modification operation is an update operation:
specifying a logical field to update and a corresponding update value,
creating an abstract update expression using the specified logical field to update and the corresponding update value,
specifying a selection condition for selecting data in the database to update, and
adding the selection condition to the abstract update expression;
an abstract model for defining an abstract query describing an instance of the modification operation performed to modify the data in the existing physical database, the abstract model comprising:
(i) a plurality of logical fields, each comprising a logical field name; and
(ii) a mapping rule for each of the plurality of logical fields, which map the plurality of logical fields to data in the physical database, wherein each mapping rule is selected from at least two different mapping rule types; and
a run-time component to transform the abstract query into a executable query consistent with the physical database.

12. The computer of claim 11, wherein the abstract query comprises a plurality of logical field names and corresponding values.

* * * * *